United States Patent
Cai et al.

(10) Patent No.: US 12,287,419 B1
(45) Date of Patent: Apr. 29, 2025

(54) UWB NLOS SIGNAL RECOGNITION METHOD BASED ON THE FIRST PATH OF CIR

(71) Applicant: Guangdong University of Technology, Guangzhou (CN)

(72) Inventors: Qianqian Cai, Guangzhou (CN); Haoqiang Ou, Guangzhou (CN); Junwei Li, Guangzhou (CN); Xiaopei Chen, Guangzhou (CN); Wentao Zhong, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/754,063

(22) Filed: Jun. 25, 2024

(30) Foreign Application Priority Data

Oct. 8, 2023 (CN) .......................... 202311291191.7

(51) Int. Cl.
G01S 5/02 (2010.01)
G01S 5/14 (2006.01)
G06N 3/08 (2023.01)
G06N 20/10 (2019.01)

(52) U.S. Cl.
CPC .............. G01S 5/0218 (2020.05); G01S 5/14 (2013.01); G06N 3/08 (2013.01); G06N 20/10 (2019.01)

(58) Field of Classification Search
CPC ......... G01S 5/0218; G01S 5/14; G06N 20/10; G06N 3/08
USPC ......................................................... 342/451
See application file for complete search history.

(56) References Cited

U.S. PATENT DOCUMENTS

| | | |
|---|---|---|
| 12,192,947 B2 * | 1/2025 | Ferrari .................. G01S 5/0278 |
| 2016/0249316 A1 * | 8/2016 | Kudekar ............... G01S 5/0284 |
| 2023/0164001 A1 * | 5/2023 | Hong .................. H04L 25/0204 375/260 |
| 2024/0214969 A1 * | 6/2024 | Fang ..................... H04W 64/00 |
| 2024/0291577 A1 * | 8/2024 | Lee ........................ H04W 52/50 |

FOREIGN PATENT DOCUMENTS

| | | | | |
|---|---|---|---|---|
| CN | 114285500 A | * | 4/2022 | ............... H04W 4/33 |
| WO | WO-2022128588 A2 | * | 6/2022 | ........... G01S 5/0273 |
| WO | WO-2024063619 A1 | * | 3/2024 | ............... G01S 5/02 |

* cited by examiner

*Primary Examiner* — Chuong P Nguyen
(74) *Attorney, Agent, or Firm* — Frank Niranjan

(57) ABSTRACT

The invention discloses an UWB NLOS signal recognition method based on the first path of CIR, including constructing a UWB ranging system comprising tags and anchors. The system controls communication between the anchor and tag, processes the raw CIR data obtained from each communication to construct data samples, and labels these samples to build a raw CIR dataset. Peak filtering is then performed on the CIR waveforms in the raw CIR dataset to identify the first path peak points of the data samples. Based on the first path peak points, valid data is determined as new data samples, and one-hot encoding is applied to the data labels. A training dataset is constructed using all new data samples and their corresponding data labels. A machine learning model is then developed and trained using the training dataset, and the trained model is saved for identifying unknown CIR signals.

11 Claims, 5 Drawing Sheets

UWB NLOS SIGNAL RECOGNITION METHOD BASED ON THE FIRST PATH OF CIR

BACKGROUND OF THE INVENTION

In the information age, the demand for short-range indoor and outdoor positioning in various fields and scenarios is rapidly increasing. As a new type of wireless communication and positioning technology, Ultra-wideband (UWB) technology has the characteristics of low energy consumption, high transmission rate, strong anti-interference capability, and high portability. UWB technology was initially used for short-range high-speed data transmission, but in recent years, its potential for indoor and outdoor precise short-range positioning has been discovered and extensively studied. UWB transmits information through ultra-narrow pulse signals, with bandwidth reaching the GHz level, and it has a wide range of applications and can be applied to many industries. For instance, in smart driving, UWB provides reliable perception information to vehicles and drivers, ensuring driving safety. In warehouse management, attaching UWB tags to assets and equipment allows for real-time tracking and monitoring of asset movement, facilitating more efficient management and allocation. Additionally, UWB technology can also be used in industrial production and manufacturing, robotics, sports equipment, smartphones, etc.

The principle of UWB ranging is to calculate the distance using the propagation speed of electromagnetic waves. It measures distance by using the signal propagation time between transmission and reception, which requires accurate determination of the Time of Arrival (ToA) of the signal. UWB sensors assume that the first arriving pulse in the Channel Impulse Response (CIR) of the received signal is the line-of-sight signal, also known as the first path. The arrival time of this first path is used as the ToA to calculate the straight-line distance between the transmitter and receiver. The resolution of the CIR is precise to the nanosecond level. Since the electromagnetic waves propagates very fast (the speed of light in vacuum is $3 \times 10^8$ meters per second), even a nanosecond error in ToA can result in a 30-centimeter error. Therefore, the accuracy of ToA measurement directly affects the accuracy of distance measurement.

However, the ranging accuracy of UWB technology can be affected by various interferences, one of which is the ranging error caused by Non-Line of Sight (NLOS). Normally, the direct path between the transmitter and the receiver (e.g. a pair of anchors and tags) is unobstructed, allowing the ranging signal to propagate without attenuation, this is generally referred to as the Line of Sight (LOS). In this case, the first path signal is the direct signal, and the ToA measurement in UWB sensors only includes measurement white noise, with no significant error. NLOS refers to the situation where the direct path between the anchor and tag is obstructed by obstacles. Since the dielectric constant of the obstacle is always greater than that of air, the propagation speed of electromagnetic waves is slower than assumed. This may result in a delay in the arrival of the UWB signal (including the first path signal) at the receiver. Consequently, there will be a significant positive bias in the ToA measurement by the UWB sensor, leading to an overestimation of the distance and affecting the positioning accuracy. FIG. 1 illustrates the LOS and NLOS scenarios, and FIG. 2 shows the typical Channel Impulse Response (CIR) for both LOS and NLOS conditions.

Since NLOS can cause inaccurate distance measurements, the data measured in NLOS scenarios are considered detrimental. Therefore, distinguishing between LOS and NLOS scenarios is key to improving the reliability of UWB.

Current technological solutions mainly involve extracting signal features from CIR data or directly using CIR data, employing traditional classification algorithms such as Support Vector Machines (SVM) and Decision Trees, or using machine learning methods for classification and identification. Although these methods can identify NLOS signals to some extent, they often involve complex models with numerous parameters, making them difficult to transplant.

SUMMARY OF THE INVENTION

The purpose of this invention is to provide a UWB NLOS signal recognition method based on the first path of the CIR, in order to overcome the problems of complex models and unsatisfactory recognition accuracy in existing methods.

In order to realize the above tasks, the present invention employs the following technical solutions:

A UWB NLOS signal recognition method based on the first path of CIR, which includes:

Constructing UWB ranging system. The system includes the tags as well as the base station, in the LOS case there is no obstacle between the base station and the tag, and in the NLOS case there is an obstacle between the base station and the tag;

Controlling the base station to communicate with the tags, processing raw CIR data obtained from each communication, and then constructing and labeling the data samples. After that, utilizing these data samples to respectively construct raw CIR datasets for both LOS and NLOS scenarios;

Performing peak filtering on the CIR waveform of each data sample in the raw CIR datasets to identify the first path peak of the data sample. Based on the first path peak, valid data in each data sample can be extracted as new data samples, and one-hot encoding can be applied to generate the data labels for the new data samples;

Utilizing new data samples and their corresponding data labels from the raw CIR datasets in both scenarios to construct the training dataset. A machine learning model is then established and trained using the training dataset. Afterwards, the trained model can be saved for the recognition of unknown CIR signals.

In addition, the processing of the raw CIR data obtained from each communication with the tag involves:

The hardware modules of the base station and the tag are identical, including an ultra-wideband transceiver and a MCU that controls the transceiver.

The MCU of the tag is used to read the raw CIR data obtained from each communication via a host computer. Based on the pulse repetition frequency of the ultra-wideband transceiver, N sample points can be extracted from the first raw CIR data to obtain the CIR waveform. This CIR waveform is composed of the channel impulse response c(t). Normalize c(t), and the normalized CIR waveform is then used as a data sample.

Furthermore, if the data samples are labeled as LOS or NLOS, the data samples correspond to LOS or NLOS conditions.

The raw CIR datasets in the LOS and NLOS scenarios are composed of data samples under the LOS and NLOS conditions, respectively.

Moreover, the peak filtering process on the CIR waveform of each data sample in the raw CIR datasets includes:

For the LOS and NLOS conditions, channel impulse response c(t) in each data sample from the CIR datasets can be constructed as follows:

$$c(t) = \sum_{k=1}^{K} a_k \delta(t - \tau_k) \quad (1)$$

where K is the total number of the multipath, t is the time parameter, $\tau_k$ is the time delay of the kth path, $a_k$ is the amplitude of the kth path, $\delta(\cdot)$ is the impulse response.

Using the following formula to perform the extreme point filter.

The gradient $\nabla_k$ between the kth and k−1th path component amplitude is expressed as $$\nabla_k = \frac{a_k - a_{k-1}}{1} \quad (2)$$

where k=2, 3, . . . , N and N is the total number of sample points.

$a_k$ is regarded as a local peak if $\nabla_k$ and $\nabla_{k-1}$ satisfy the following formula $$\nabla_k \times \nabla_{k-1} < 0 \quad (3)$$

Retain the local peaks $a_k$ to complete the peak filtering process of the CIR waveform, with the filtered CIR denoted as c*(t).

Furthermore, the identification of the first path peak point in the data samples of the raw CIR dataset includes:

For c*(t), traverse each sample point $a_k$, where i=1, 2, . . . , M, and M is the number of sample points in c*(t). Formula (4) is used to calculate the mean amplitude of the sample points $\{a_1^*, a_2^*, \ldots, a_i^*\}$, and determine whether the sample point at meets the condition of formula (5). If it does, identify the sample point $a_i^*$ as the first path peak point.

$$\mu_i^* = \frac{\sum_{j=1}^{i} a_j^*}{i} \quad (4)$$

where $a_j^*$ is the jth sample point, $\mu_i^*$ is the mean amplitude of $\{a_1^*, a_2^*, \ldots, a_i^*\}$.

If $a_i^*$ is the maximum value among $\{a_1^*, a_2^*, \ldots, a_i^*\}$, and is greater than 4 times the mean amplitude, then $a_i^*$ is considered an outlier of $\{a_1^*, a_2^*, \ldots, a_i^*\}$, i.e., the first path peak point in that data sample.

$$\begin{cases} a_i^* = \max\{a_1^*, a_2^*, \ldots, a_i^*\} \\ a_i^* > 4\mu_i^* \end{cases} \quad (5)$$

Additionally, based on the first path peak point, extracting the valid data from each data sample as new data samples includes:

For each data sample in the raw CIR dataset, M sample points (starting from the identified first path peak point) are extracted from the channel impulse response c(t) of the N sample points in that data sample to form the new data sample c'(t).

Here, the value of N is 200, and the value of M is 30.

What's more, the machine learning model includes an SVM classifier or a BP neural network.

Furthermore, for an unknown CIR signal, the first path peak point will be extracted at first, and then the valid data of this unknown CIR signal will be obtained as input data. Subsequently, a trained machine learning model is used for recognition to obtain the recognition result of the unknown CIR signal.

Compared to existing technologies, this invention has the following technical features:

1. This invention uses a signal filtering method to retain the local peaks in the channel impulse response (CIR) waveform, resulting in a waveform that approximates the upper envelope, and improves the smoothness of the waveform curve.
2. This invention proposes a first path recognition method that is not interfered by multipath effect. By accurately identifying the starting point of the valid data in the CIR waveform, the CIR data which reflect the characteristics of the ranging signal to the greatest extent can be extracted, thereby improving the utilization of the raw data.
3. This invention uses CIR data, intercepted based on first path recognition, to train a machine learning model. Compared with using raw CIR data directly, it significantly improves the accuracy and enhances portability while reducing model complexity.

DETAILED DESCRIPTION OF THE INVENTION

In the following, the technical solution of this application is explained in conjunction with the system.

Figure 3:
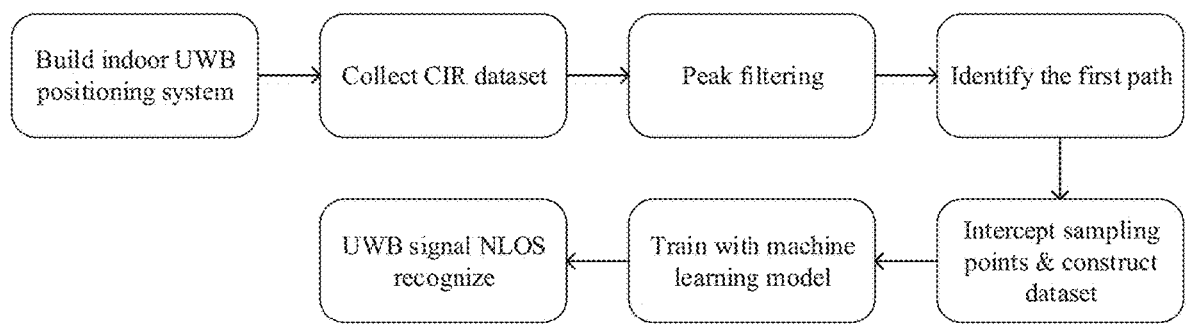
FIG. 3 shows a schematic flow diagram of the method of the present invention.

As shown in FIG. 3, the ultra-wideband NLOS signal recognition method based on the first path of the CIR provided by this application includes the following steps:

Step 1: Constructing the UWB ranging system

The UWB ranging system described in this invention can be used in various indoor environments such as offices, shopping malls, and parking lots. In these environments, there are base stations and tags. In the LOS situation, there are no obstacles between the base stations and the tags, while in the NLOS situation, there are obstacles between them.

Figure 4:
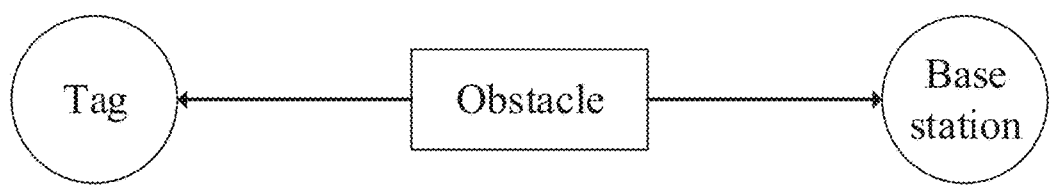
FIG. 4 shows a schematic diagram of a UWB ranging scenario.

To facilitate understanding of the technical solution of this application, the applicant has constructed a UWB ranging system. As shown in FIG. 4, this system includes two roles: base stations and tags. The hardware modules of the base stations and tags are identical, including an ultra-wideband transceiver DW3000 and an STM32f103cb microcontroller unit (MCU) that controls the transceiver.

Step 2: Obtaining and preprocessing the raw CIR data to construct the raw CIR dataset Step 2.1: Writing the MCU program In both LOS and NLOS scenarios, the communication between the base station and the tag is controlled. The tag is then connected to the host computer, and the MCU of the tag is used to read the 0x15 register of the ultra-wideband transceiver DW3000 to obtain the raw CIR data in real-time for each communication. After reading, uploading the data to the host computer via the UART serial protocol.

Step 2.2: Processing the raw CIR data to construct data samples

The 0x15 register of the DW3000 transceiver can store up to three sets of raw CIR data. The first set of raw CIR data is generated by default, while the second and third sets are generated under specific conditions.

In this method, only the first set of raw CIR data is read. If the DW3000's Pulse Repetition Frequency (PRF) is 16 MHz, then the first set of raw CIR data contains 992 sample points. If the PRF is 64 MHz, the first set will contain 1016 sample points.

The PRF of the DW3000 used in this method is 64 MHz, therefore providing 1016 sample points for the raw CIR data. The sample points with index values from 700 to 900 are then extracted to obtain the CIR waveform, which is composed of the channel impulse response c(t). After normalizing c(t), CIR waveform can be used as a data sample.

Step 2.3: Constructing the raw CIR dataset

In both LOS and NLOS scenarios, the corresponding data samples are used to construct the corresponding raw CIR datasets, and each data sample of the two raw CIR datasets is assigned with a data label. This data label is either a LOS label or an NLOS label, marking whether the data sample corresponds to the LOS or NLOS condition.

Figure 1:
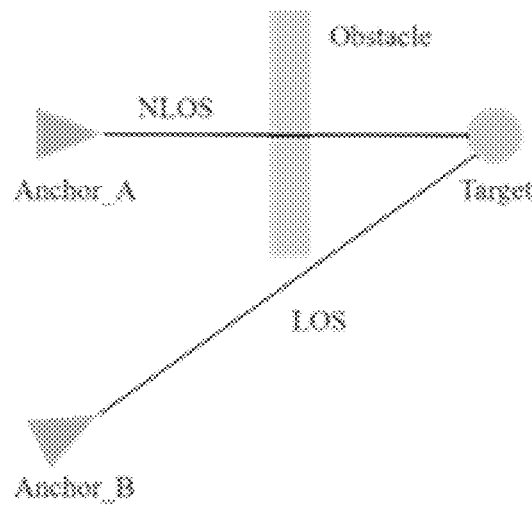
FIG. 1 shows a schematic diagram of line-of-sight and non-line-of-sight.
Figure 2:
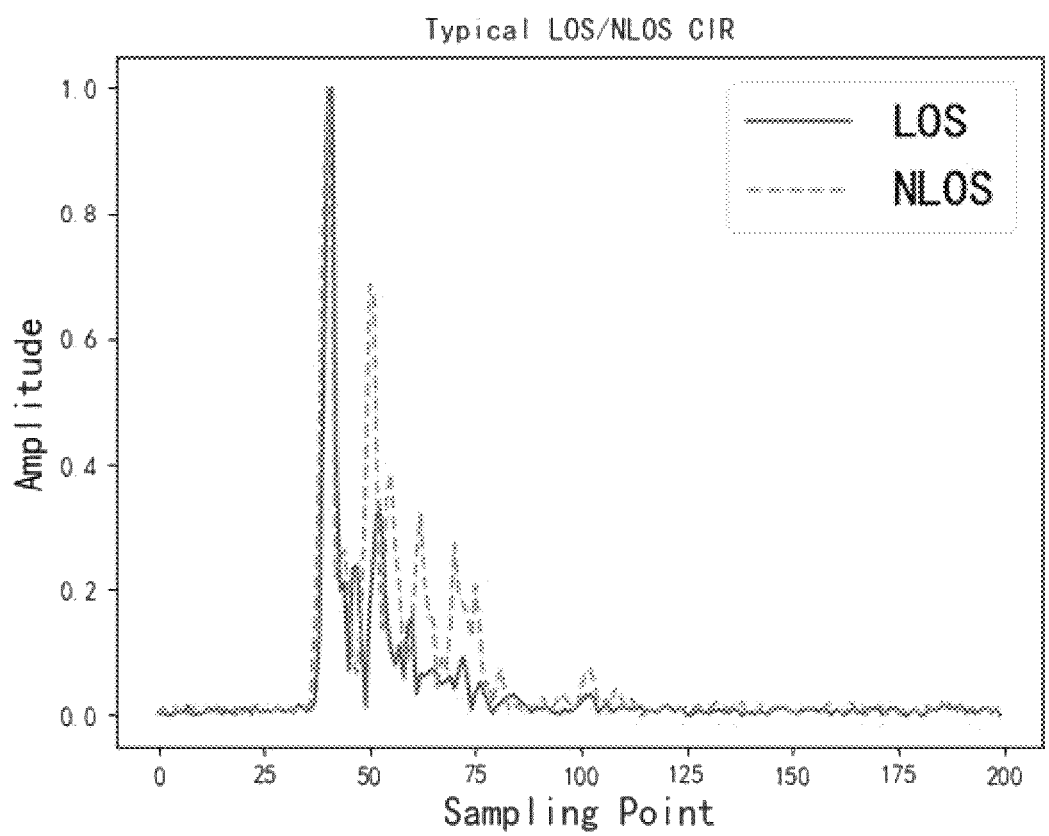
FIG. 2 shows a schematic diagram of typical LOS and NLOS waveforms.

Therefore, each data sample in the final raw CIR dataset contains 200 amplitudes of sample points and one LOS or NLOS identifier. FIG. 2 shows the examples of the waveforms of sample points extracted from CIR for both LOS and NLOS scenarios, with indices ranging from 700 to 900.

Step 3: Peak filtering process for the CIR waveform of each data sample in the raw CIR dataset In order to reduce the impact of multipath effects on signal processing, the channel impulse response c(t) in each data sample in the raw CIR datasets constructed separately for the LOS and NLOS scenarios, uses formulas (2) and (3) to perform peak filtering. This process retains only the peak components of the signal response waveform.

The formula for the channel impulse response c(t) is:

$$c(t) = \sum_{k=1}^{K} a_k \delta(t - \tau_k) \quad (1)$$

where K is the total number of the multipath, t is the time parameter, $\tau_k$ is the time delay of the kth path, $\delta(\cdot)$ is the impulse response.

$a_k$ is the amplitude of the kth path, thus the gradient $\nabla_k$ between kth to k−1th path is denoted as $$\nabla_k = \frac{a_k - a_{k-1}}{1} \quad (2)$$

where k=2, 3, ..., N and N is the total number of sample points. The value of N in this example is 200.

$a_k$ is regarded as a local peak if $\nabla_k$ and $\nabla_{k-1}$ satisfy the following formula $$\nabla_k \times \nabla_{k-1} < 0 \quad (3)$$

Retain the local peaks $a_k$ to complete the peak filtering process of the CIR waveform, with the filtered CIR denoted as c*(t).

Figure 5:
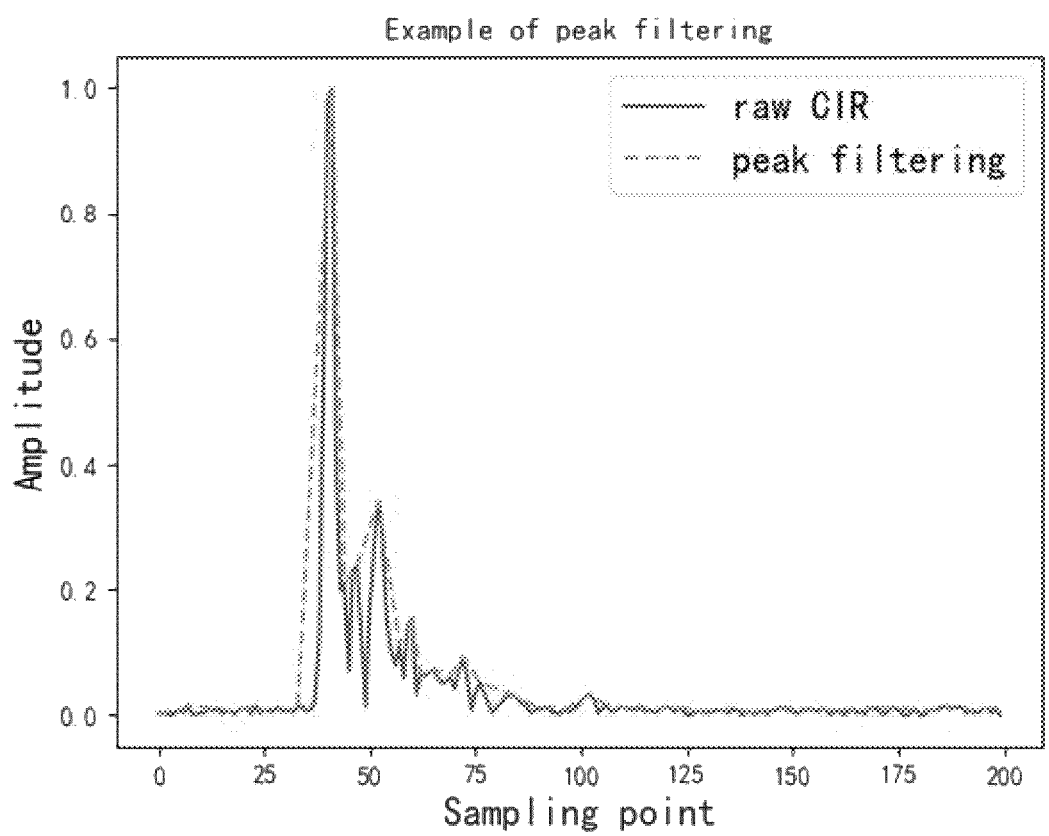
FIG. 5 shows a comparison of wave filtering results of data samples in the embodiment.

The formula (3) indicates that if the amplitude of the kth path at previous time is less than $a_k$, and the amplitude of the next time is greater than $a_k$, the local peaks retained after filtering will be connected. This process forms an approximate upper envelope curve for the original CIR waveform. FIG. 5 shows the peak filtering result.

Step 4: Identification of the first path peak point of the data samples in the raw CIR dataset For c*(t), traverse each sample point $a_k$, where i=1, 2, ..., M, and M is the number of sample points in c*(t). Use formula (4) to calculate the mean amplitude of the sample points $\{a_1^*, a_2^*, \ldots, a_i^*\}$, and determine whether the sample point $a_i^*$ meets the condition of formula (5). If it does, identify the sample point $a_i^*$ as the first path peak point.

$$\mu_i^* = \frac{\sum_{j=1}^{i} a_j^*}{i} \quad (4)$$

where $a_j^*$ is the jth sample point, $\mu_i^*$ is the mean amplitude of $\{a_1^*, a_2^*, \ldots, a_i^*\}$.

If $a_i^*$ is the maximum value among $\{a_1^*, a_2^*, \ldots, a_i^*\}$, and greater than 4 times the mean amplitude, then $a_i^*$ is considered as an outlier of $\{a_1^*, a_2^*, \ldots, a_i^*\}$, i.e., the first path peak point in that data sample.

$$\begin{cases} a_i^* = \max\{a_1^*, a_2^*, \ldots, a_i^*\} \\ a_i^* > 4\mu_i^* \end{cases} \quad (5)$$

Figure 6:
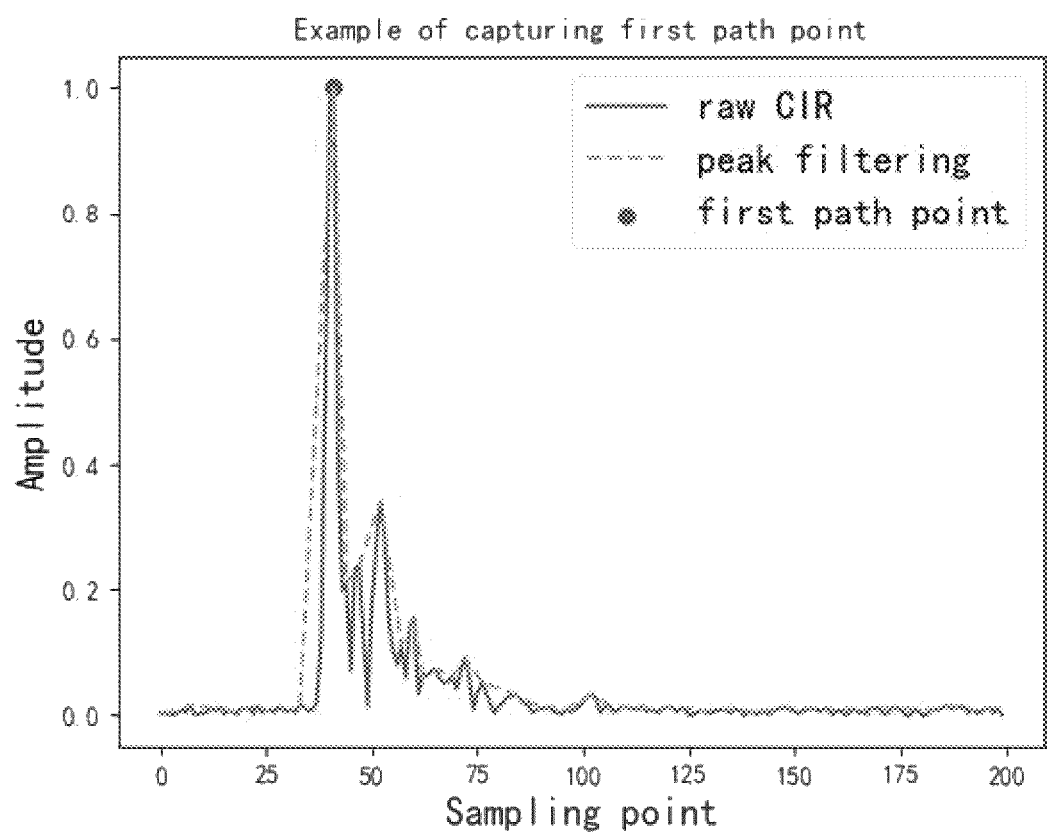
FIG. 6 shows a diagram of the first path identification results of data samples in the embodiment.

FIG. 6 is the results of identifying the first path peak points.

In this step, the criterion for identifying outliers is that if the value of a point is greater than four times the mean value of the dataset, it is considered as an outlier. This approach is based on the statistical 3σ outlier identification rule. The 3σ rule states that if a set of data satisfies or approximates a normal distribution, and the amount of data is sufficiently large, the data can be divided into intervals based on certain probabilities. Data points outside the interval are considered as outliers or errors. However, after peak filtering, the CIR waveform only contains a variable number of sample points, which is insufficient to meet the conditions for using the 3σ rule. Therefore, the statistical 3σ rule cannot be directly applied.

Step 5: Extracting valid data and encoding two types of labels using one-hot encoding to construct the training dataset.

Step 5.1: For each first path peak point identified in the data samples in each raw CIR dataset, 30 sample points starting from the first path peak point are extracted from the channel impulse response c(t) of the 200 sample points to form the new data sample c'(t). Performing one-hot encoding on the data labels corresponding to each data sample, using 0 and 1 to represent the labels for the new data samples.

Step 5.2: Constructing the training dataset using all the new data samples and their corresponding data labels from the two raw CIR datasets.

Retaining 30 sample points allows for discarding most of the useless data and keeping the data that reflects CIR changes, which is helpful to reduce the complexity of the subsequent model and improve system response. One-hot encoding is suitable for encoding discrete features. It converts the string data formats into digital forms, which helps classifiers to process attribute data.

Step 6: Machine learning model setup and model training

Machine learning model such as Support Vector Machine (SVM) classifier or

Backpropagation (BP) neural network can be used in this approach.

1. SVM Classifier

Scikit-learn is a commonly used Python machine learning library. SVM is an effective binary classification model that learns in a supervised manner. The goal of SVM is to find a hyperplane which has the largest distance from the data points of two classes (0 and 1) as the decision boundary. For the new data samples c'(t), input them into the machine learning model as input data c'(t)=X={$x_1, x_2, \ldots, x_{30}$}, together with the corresponding data labels y. The trained machine learning model is then saved.

Here, y∈{0,1} represents the data labels corresponding to the LOS and NLOS conditions respectively. The equation for the hyperplane is:

$$\omega^T X + b = 0 \quad (6)$$

where ω is the normal vector of the hyperplane and b is the intercept of the hyperplane.

So equation (6) can also be expressed as.

$$\omega_1 x_1 + \omega_2 x_2 + \ldots + \omega_k x_k + b = 0 \quad (7)$$

The parameter update is based on the stochastic gradient algorithm. The loss function is the binary cross-entropy function, the number of iterations is 200 and the learning rate is 0.001.

Using the SVM class from the Scikit-learn library to implement the SVM for NLOS recognition. If the SVM output is less than 0, it will be considered as LOS; if it is greater than 0, it will be considered as NLOS.

2. BP Neural Network

The architecture of the BP neural network model is built using the Pytorch framework as shown in Table 1. Pytorch is a commonly used Python machine learning library. The BP neural network consists of three fully connected layers, where the first layer serves as the input layer, the second layer acts as the hidden layer, and the third layer serves as the output layer. The activation functions for the first two fully connected layers are ReLU functions, which help avoid the problems of gradient explosion or vanishing and reduce computational complexity by eliminating complex factor computations. The activation function for the last fully connected layer is the sigmoid function, which outputs a value between 0 and 1. If the output is less than 0.5, it is considered as LOS; if it is greater than 0.5, it is considered as NLOS.

In another example of this invention, a BP neural network is used as the machine learning model. The relevant parameter settings are as follows:

TABLE 1

Architecture of BP neural network model

| | Number of nodes | Activation function |
|---|---|---|
| Fully connected layer 1 | 64 | Relu |
| Fully connected layer 2 | 32 | Relu |
| Fully connected layer 3 | 1 | Sigmoid |

Step 7: For an unknown CIR signal, follow the methods outlined in steps 3 and 4 to extract the first path peak point of the signal. Then, the method described in step 5 is used to obtain the channel impulse response c'(t) of the unknown CIR signal after extraction. This c'(t) is considered as input data, and the machine learning models that have been trained in step 6 are utilized to obtain the recognition results of the unknown CIR signal.

The comparison of the recognition results of the two machine learning models in this invention is as follows:

TABLE 2

NLOS identification results of two machine learning model

| | | Precision | Accuracy | Recall | F1 score |
|---|---|---|---|---|---|
| SVM | Raw CIR | 89% | 91.9% | 84.2% | 87.9% |
| | Processed CIR with 30 points | 96.0% | 98.9% | 93.0% | 95.8% |
| BP neural network | Raw CIR | 95.5% | 93.5% | 98.0% | 95.7% |
| | Processed CIR with 30 points | 98.5% | 98.0% | 98.9% | 98.5% |

The above embodiments are merely illustrative of the technical solutions of the present application and are not intended to limit its scope. Although the present application has been described in detail with reference to the foregoing embodiments, those skilled in the art will understand that various changes, substitutions, and alterations can be made without departing from the spirit and scope of the invention as defined by the appended claims. All such modifications and equivalents are intended to be included within the scope of the present application.

The invention claimed is:

1. An UWB NLOS signal recognition method based on a first path of CIR, including:
   constructing UWB (Ultra-Wideband) ranging system, wherein the UWB ranging system includes the tags as well as a base station, in an LOS (Line-of-Sight) case there is no obstacle between the base station and the tag, and in the NLOS (Non-Line-of-Sight) case there is an obstacle between the base station and the tag;
   controlling the base station to communicate with the tags, processing raw CIR (Channel Impulse Response) data obtained from each communication, and then constructing and labeling data samples, after that, utilizing these data samples to respectively construct raw CIR datasets for both LOS and NLOS scenarios;
   performing peak filtering on a CIR waveform of each data sample in the raw CIR datasets to identify a first path peak of the data sample;
   extracting valid data in each data sample as new data samples, and utilizing one-hot encoding to generate data labels for new data samples based on the first path peak;

utilizing new data samples and their corresponding data labels from the raw CIR datasets in both scenarios to construct a training dataset, establishing a machine learning model and training the machine learning model by using the training dataset;

saving the machine learning model, and recognizing unknown CIR signals by using the machine learning model;

wherein a step of performing an extreme point filtering process on the CIR waveforms of the data samples in each CIR raw data set includes:

for LOS and NLOS conditions, channel impulse response c(t) in each data sample from the CIR datasets can be constructed as follows:

$$c(t) = \sum_{k=1}^{K} a_k \delta(t - \tau_k) \quad (1)$$

wherein K is a total number of the multipath, t is a time parameter, $\tau_k$ is a time delay of a kth path, $a_k$ is a amplitude of the kth path, $\delta(\cdot)$ is an impulse response, using a following formula to perform the extreme point filtering process, a gradient $\nabla_k$ between the kth and k−1th path component amplitude is expressed as $$\nabla_k = \frac{a_k - a_{k-1}}{1} \quad (2)$$

where k=2, 3, ..., N and N is a total number of sample points, $a_k$ is regarded as a local peak if $\nabla_k$ and $\nabla_{k-1}$ satisfy a following formula $$\nabla_k \times \nabla_{k-1} < 0 \quad (3)$$

retaining the local peaks ax to complete the peak filtering process of the CIR waveform, with a filtered CIR denoted as c*(t)

wherein a step of identifying the first path peak of the data sample includes:

for c*(t), traverse each sample point ax, where i=1, 2, ..., M, and M is a number of sample points in c*(t), formula (4) is used to calculate a mean amplitude of the sample points $\{a_1^*, a_2^*, \ldots, a_i^*\}$, and determine whether the sample point $a_i^*$ meets a condition of formula (5), identifying the sample point $a_i^*$ as a first path peak point, $$\mu_i^* = \frac{\sum_{j=1}^{i} a_j^*}{i} \quad (4)$$

where $a_j^*$ is a jth sample point, $\mu_i^*$ is a mean amplitude of $\{a_1^*, a_2^*, \ldots, a_i^*\}$, if $a_i^*$ is the maximum value among $\{a_1^*, a_2^*, \ldots, a_i^*\}$, and is greater than 4 times a mean amplitude, then $a_i^*$ is considered an outlier of $\{a_1^*, a_2^*, \ldots, a_i^*\}$, the first path peak point in that data sample $$\begin{cases} a_i^* = \max\{a_1^*, a_2^*, \ldots, a_i^*\} \\ a_i^* > 4\mu_i^* \end{cases} \quad (5)$$

extracting the valid data from each data sample as a new data sample based on the first path peak point, including:

for each data sample in the raw CIR dataset, M sample points (starting from the identified first path peak point) are extracted from the channel impulse response c(t) of the N sample points in that data sample to form the new data sample c'(t).

2. The UWB NLOS signal recognition method based on the first path of CIR according to claim 1, wherein a step of processing the raw CIR data obtained from each communication of the tag, constructing data samples, includes:

hardware modules of the base station and the tag are identical, including an ultra-wideband transceiver and a MCU (Microcontroller Unit) that controls the transceiver, using the MCU of the tag to read the raw CIR data obtained from each communication via a host computer based on the pulse repetition frequency of the ultra-wideband transceiver;

extracting N sample points from the first raw CIR data to obtain the CIR waveform, wherein this CIR waveform is composed of the channel impulse response c(t), normalize c(t), and the normalized CIR waveform is then used as a data sample.

3. The UWB NLOS signal recognition method based on the first path of CIR according to claim 1, wherein the data samples are labeled with either a LOS tag or a NLOS tag, the data samples are marked as either a LOS situation or a NLOS situation; the raw CIR datasets for the LOS and NLOS scenarios are composed of data samples under the LOS and NLOS conditions, respectively.

4. The UWB NLOS signal recognition method based on the first path of CIR according to claim 1, wherein the value of N is 200 and the value of M is 30.

5. The UWB NLOS signal recognition method based on the first path of CIR according to claim 1, wherein the machine learning model at least includes an SVM (Support Vector Machine) classifier or a BP neural network (Backpropagation neural networks).

6. The UWB NLOS signal recognition method based on the first path of CIR according to claim 1, future including:

for an unknown CIR signal, extracting the first path peak point at first;

obtaining the valid data of this unknown CIR signal as input data;

subsequently using a trained machine learning model for recognition to obtain the recognition result of the unknown CIR signal.

7. An UWB NLOS signal recognition method based on the first path of CIR, including:

constructing UWB (Ultra-Wideband) ranging system, wherein the UWB ranging system includes tags as well as a base station, in a LOS (Line-of-Sight) case there is no obstacle between the base station and the tag, and in the NLOS (Non-Line-of-Sight) case there is an obstacle between the base station and the tag;

controlling the base station to communicate with the tags, processing raw CIR (Channel Impulse Response) data obtained from each communication, and then constructing and labeling data samples, utilizing these data samples to respectively construct raw CIR datasets for both LOS and NLOS scenarios;

performing peak filtering on a CIR waveform of each data sample in the raw CIR datasets to identify a first path peak of the data sample;

extracting valid data in each data sample as new data samples, and utilizing one-hot encoding to generate data labels for new data samples based on the first path peak;

utilizing new data samples and their corresponding data labels from the raw CIR datasets in both scenarios to construct a training dataset, establishing a machine learning model and training the machine learning model by using the training dataset, afterwards;

saving the machine learning model, and recognizing unknown CIR signals by using the machine learning model.

8. The UWB NLOS signal recognition method based on the first path of CIR according to claim 7, wherein a step of processing the raw CIR data obtained from each communication of the tag, constructing data samples, includes:

hardware modules of the base station and the tag are identical, including an ultra-wideband transceiver and a MCU (Microcontroller Unit) that controls the transceiver, using the MCU of the tag to read the raw CIR data obtained from each communication via a host computer based on the pulse repetition frequency of the ultra-wideband transceiver;

extracting N sample points from the first raw CIR data to obtain the CIR waveform, wherein this CIR waveform is composed of the channel impulse response c(t), normalize c(t), and the normalized CIR waveform is then used as a data sample.

9. The UWB NLOS signal recognition method based on the first path of CIR according to claim 7, wherein the data samples are labeled with either a LOS tag or a NLOS tag, the data samples are marked as either a LOS situation or a NLOS situation; the raw CIR datasets for the LOS and NLOS scenarios are composed of data samples under the LOS and NLOS conditions, respectively.

10. The UWB NLOS signal recognition method based on the first path of CIR according to claim 7, wherein the machine learning model at least includes an SVM (Support Vector Machine) classifier or a BP neural network (Back-propagation neural networks).

11. The UWB NLOS signal recognition method based on the first path of CIR according to claim 7, future including:

for an unknown CIR signal, extracting the first path peak point at first;

obtaining the valid data of this unknown CIR signal as input data;

subsequently using a trained machine learning model for recognition to obtain the recognition result of the unknown CIR signal.

* * * * *